United States Patent [19]

Brüne et al.

[11] Patent Number: 5,633,292
[45] Date of Patent: May 27, 1997

[54] METHOD FOR PRODUCING COLD POLYURETHANE FOAMS

[75] Inventors: Anette Brüne; Georg Burkhart, both of Essen; Volker Zellmer, Bottrop, all of Germany

[73] Assignee: Th. Goldschmidt AG., Essen, Germany

[21] Appl. No.: 568,888

[22] Filed: Dec. 7, 1995

[30] Foreign Application Priority Data

Dec. 16, 1994 [DE] Germany ............... 44 44 898.8

[51] Int. Cl.[6] .......................... C08G 18/24; C08G 18/61
[52] U.S. Cl. ..................... 521/112; 521/110; 521/126
[58] Field of Search ............................ 521/110, 112

[56] References Cited

U.S. PATENT DOCUMENTS

| | | | |
|---|---|---|---|
| 3,741,917 | 6/1973 | Morehouse | 260/448.2 |
| 3,952,038 | 4/1976 | Prokai | 260/448.2 N |
| 4,031,044 | 6/1977 | Joslyn | 260/2.5 AH |
| 4,039,490 | 8/1977 | Kanner | 260/2.5 AC |
| 4,067,828 | 1/1978 | Kanner et al. | 260/2.5 AH |
| 4,110,272 | 8/1978 | Kanner et al. | 521/111 |

FOREIGN PATENT DOCUMENTS

| | | |
|---|---|---|
| 0037067 | 10/1981 | European Pat. Off. . |
| 0106101 | 4/1984 | European Pat. Off. . |
| 0243131 | 10/1987 | European Pat. Off. . |
| 2221811 | 11/1973 | Germany . |
| 2356443 | 5/1974 | Germany . |
| 2402690 | 9/1974 | Germany . |
| 2533074 | 3/1976 | Germany . |
| 2736138 | 3/1979 | Germany . |
| 2507161 | 9/1981 | Germany . |
| 2603498 | 2/1982 | Germany . |
| 3626297 | 7/1987 | Germany . |

*Primary Examiner*—Morton Foelak
*Attorney, Agent, or Firm*—Anderson Kill & Olick P.C.

[57] ABSTRACT

The invention relates to a method for the production of high resilience polyurethane foams by reacting a mixture of highly reactive polyols, which usually have an average molecular weight of between about 4800 and 6500 g/mole and at least 70% primary hydroxyl groups and optionally contain fillers, polyfunctional isocyanates, amine activators, cross-linking agents, tin catalysts, blowing agents and stabilizers, compounds of the general formula

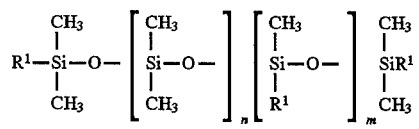

being used as stabilizers, in which $R^1$ is the same or different in the average molecule and represents a methyl group or a group of the general formula $-CH_2-CH_2-(CH_2)_a-C_6H_3(R^2)_2$ (a=0 or 1; $R^2=-O-CH_3$), with the proviso that at least one $R^1$ group is a group having the formula $-CH_2-CH_2-(CH_2)a-C_6H_3(R^2)_2$ n has an average numerical value of 2 to 11, m has an average numerical value of 1 to 6, with the proviso that the quotient $p=(n+m+2)/m$ is 1.66 to 12.

2 Claims, No Drawings

METHOD FOR PRODUCING COLD POLYURETHANE FOAMS

FIELD OF THE INVENTION

The present invention relates to a method of producing high resilience polyurethane foams utilizing an inventive stabilizer having very little or no volatile components so as to eliminate or reduce the fogging deposits.

BACKGROUND INFORMATION OF THE PRIOR ART

The production of flexible polyurethane foams on industrial scale using isocyanates, polyether polyols, optionally cross linkers and other suitable additives has long been known and is described, for example in Becker/Braun, Kunststoff-Handbuch (Plastics Handbook), Volume 7, Polyurethanes, Carl Hanser Verlag, Munich; Vienna, 2nd edition, 1983.

Depending on the reactivity of the raw materials, a differentiation is made between conventional hot cured flexible foams (referred to hereinafter as conventional flexible foams) and cold cured flexible foams (referred to hereinafter as high resilience (HR-) foams), the concepts being derived from manufacturing foams in a mold. For example, when producing conventional flexible foams in a mold, it is necessary to heat the mold at an elevated temperature to complete the cross linking due to the lower reactivity of the raw materials; these foams therefore are referred to as hot cured foams.

On the other hand, the development of highly reactive polyether polyols and optionally the additional use of cross linkers makes it possible to produce foams in the mold while supplying less heat because of the rapid curing. Such foams are therefore referred to as cold cured foams.

Aside from foaming in a mold, it is also possible to produce foam by the slabstock method, where too the concepts of conventional flexible and high resilience foam have become established.

Because of the different, basic raw materials, the high resilience foams have quite typical, physical properties, which differ from those of the conventional flexible foams.

The high resilience foams have:

(a) a latex-like feel, (b) an elasticity higher than that of conventional flexible foams, hence these foams are also referred to as "high resilient foams" (referred to hereinafter as HR-foams), (c) compression hardness characteristics, which are different from those of conventional flexible foam (higher SAG factor) and thus offer better seating comfort when used as upholstery material (furniture foam), (d) good permanent use properties with only a slight tendency to develop fatigue, which is of interest particularly in the automobile sector, (e) because of their melting behavior, a better flame resistance than conventional flexible foams, (f) a more advantageous energy balance sheet and shorter molding times for the molding operation.

In particular, the production of flexible polyurethane foams involves reacting a mixture of polyol, polyfunctional isocyanate, amine activator, tin catalyst, stabilizer, blowing agent (either water for forming carbon dioxide and/or the addition of physical blowing agents), optionally with the addition of flame retardants, cross linkers or other conventional processing aids.

The decisive difference between conventional foams and high resilience foams consists therein that highly reactive polyols and, in addition, low molecular weight cross linkers are used for the production of the latter. The function of the cross linker can also be assumed by isocyanates of higher functionality (so-called "crude MDI"). Accordingly, the reaction between the isocyanate groups and the hydroxyl groups readily takes place in the expansion phase ($CO_2$ formation from —NCO and water) of the foam. This rapid polyurethane reaction leads first to an increase in the viscosity and then to a relatively high inherent stability of the foam during the blowing process.

Accordingly, stabilizers are required for the high resilience foams, which control the cell size and cell size distribution, and stabilize the surface area as well, but have no or only weak bulk stabilizing properties. Furthermore, the proportion of closed cells is higher in HR- foams than in conventional foams and these cells must be crushed open after removal from the mold. In addition, the HR- foam has an irregular cell structure and, as a rule, coarser cells than a conventional flexible foam and this contributes to its properties mentioned above.

Highly reactive polyols are used as polyols. On the one hand, these are trifunctional polyols which, aside from a high molecular weight of usually between about 4,800 and 6,500 g/mole, have at least 70% (up to 95%) primary hydroxyl groups, so that their OH number is between 36 and 26. These polyols are synthesized to the extent of up to 90% from propylene oxide, but contain ethylene oxide end groups almost exclusively. The primary hydroxyl groups are far more reactive with respect to isocyanate groups than are the secondary hydroxyl groups of the polyols used for the conventional flexible foam. Their hydroxyl numbers usually are between 56 and 42 for molecular weights of between 3,000 and 4,500.

The highly reactive polyols are obtained by the polyaddition of propylene oxide or ethylene oxide to compounds of higher functionality, such as glycerin or trimethylolpropane, in the presence of basic compounds.

The so-called filled polyols represent a further class of highly reactive polyols. Aside from the characteristic data listed above, they are distinguished by the fact that they contain solid organic fillers up to a solids content of 40% or more in dispersed distribution. These polyols are differentiated into:

A. Polymer polyols. These are highly reactive polyols, which contain a dispersion of a copolymer based on styrene and acrylonitrile.

B. PHD polyols. These are highly reactive polyols, which contain polyurea also in dispersed form.

C. PIPA polyols. These are highly reactive polyols, which contain a polyurethane (formed by the in situ reaction of an isocyanate with an alkanolamine in a conventional polyol) in dispersed form.

The solids content, which preferably lies between 5% and 40% depending on the application, is responsible for improved cell opening, so that the polyol can be reacted in a controlled manner particularly with TDI to avoid shrinkage of the foams. The solid acts essentially as a processing aid. A further function consists therein that the hardness can be controlled by the solids content, since the hardness of the foam increases with increasing solids content.

Formulations with solids-containing polyols are clearly less inherent stable and therefore, aside from chemical stabilization by the cross linking reaction, also require a physical stabilization.

Depending on the solids content of the polyols, the latter are used alone or in admixture with the above-named unfilled polyols.

TDI (a mixture of 2,4- and 2,6-toluylene diisocyanate isomers) as well as MDI (4,4'-diphenylmethane diisocyanate) are used as isocyanate. In addition to the 4,4'-isomer, the so-called "crude MDI" also contains the 2,4'- and 2,2'- isomers, as well as products with more aromatic rings. "Pure MDI" is a product with a single aromatic ring consisting predominantly of a mixture of 2,4'- and 4,4'- isomers or their prepolymers.

Different isocyanates are frequently used for slabstock foams and molded foams. For example, in HR-slabstock foaming, pure TDI (different mixtures of 2,4- and 2,6- isomers) are usually used in combination with solids-containing polyols. Furthermore, modified TDI types are also used in combination with highly reactive, unfilled polyols. The use of crystalline polyhydroxy compounds as cross linkers in slabstock production, in combination with highly reactive, unfilled polyols, as well as TDI, trimerized TDI or also mixtures of TDI and MDI is also described in the German patents 25 07 161 and 26 03 498. On the other hand, pure MDI formulations are not normally used for the production of HR- slabstock foams.

The formulations based on pure TDI, initially developed for foaming in molds, had the disadvantage of a narrow processing latitude. However, formulations, based on TDI 80 admixtures with crude MDI (up to 20% or more) in combination with filled polyols permitted reliable foaming. Systems based on TDI with crude MDI in ratios usually of 70:30 to 40:60, in combination with unfilled polyols, are also in common use at the present time.

In addition, formulations are also found, which are based on MDI alone without the admixture of TDI and which use unfilled polyols. At the same time, the ratio of the 2,4'- to 4,4'- isomers and of monomeric to polymeric isocyanate can be varied within a wide range.

As amine activators, preferably tertiary amines, such as the predominantly cross linking triethylene diamine (TEDA), which catalyzes the reaction between isocyanate and polyol, or the predominantly blowing bis(2-dimethylamino-ethyl) ether (BDE), which catalyzes the reaction between isocyanate and water, is used. Many formulations are based on a combination catalysis of these two compounds. Other common amines are, however also possible; the amount used usually is between 0.05 and 0.2 parts per 100 parts of polyol.

Cross linking agents are low molecular compounds, which are multifunctional with respect to isocyanates. Suitable cross linking agents are hydroxyl-terminated or amine-terminated substances, such as glycerin, triethanolamine (TEOA), diethanolamine (DEOA) and trimethylol propane. They are used at concentrations usually between 0.5 and 2.0 parts per 100.0 parts of polyol, depending on the formulation. However, the concentration used may also fall outside of these limits. When crude MDI is used for foaming in molds, it also assumes a cross linking function. Therefore, as the amount of crude MDI is increased, the content of low molecular weight cross linking agent can be reduced correspondingly.

The polyurethane reaction generally is catalyzed by the addition of tin activators. Either dibutyl tin dilaurate (DBTL) or also tin(II) octoate is used in an amount usually between 0.01 and 0.3 parts per 100.0 parts of polyol. However, the amount may also be different.

Blowing agents are divided into chemical and physical blowing agents. The chemical blowing agents include water, which upon reacting with the isocyanate group, leads to the formation, of carbon dioxide. The bulk density of the foam is controlled by the amount of water added, preferably 1.5 to 4.0 parts being added per 100.0 parts of polyol. Moreover, additional, physical blowing agents (such as chlorofluorohydrocarbons, methylene chloride, acetone, 1,1,1-trichloroethane, etc.) can also be used.

Furthermore, stabilizers are required for the production of high resilience foam. They control the cell size and cell size distribution and regulate the subsurface area of the foam, but, in comparison to conventional flexible foam stabilizers, usually have only weak stabilizing properties. The stabilizer requirements are different for slabstock and molded foam production.

Aside from foam stabilization, the necessary cell opening at the correct time is the actual problem in the case of the slabstock process. If the polymerization reaction at the end of the expansion has already proceeded to such an extent, that the block is already chemically stabilized completely, cell opening can usually no longer be carried out. The whole of the block will therefore shrink. If cell opening takes place prematurely, then this leads either to a collapse of the foam or, in the case of systems that are inherently relatively stable, to a foam which can suffer a shrinking process some hours after its production. The time as well as the intensity of the cell opening can be controlled with the help of a suitable stabilizer. In addition, the stabilizer shall regulate the cell structure and, in particular, the subsurface area (especially important for molded foam). The HR- foam should have a slightly coarser cell and an irregular cell structure, so that its special physical properties are attained.

The stabilizer for the HR- slabstock foam must therefore primarily control foam stabilization, cell opening at the correct time, cell regulation and cell size distribution.

For the production of molded foams, there are additional requirements. In order to fill the whole volume of the mold, the expanding reaction mixture must overcome relatively wide flow paths. The frictional resistance at the mold walls easily leads to destruction of whole cell structures, so that cavities are formed under the foam skin. These defects also occur when the foam must surround parts inserted for reinforcement. Vent holes represent a further critical zone. If the excess blowing gas flows at too high a rate past the cells, it causes partially collapsed zones.

Moreover, the nature of the foam skin is evaluated critically.

To sum up, a stabilizer for HR- molded foam must meet the following requirements: sufficient stabilizing of the foam, stabilization against the effects of shear forces, stabilization of the subsurface area and the skin, control of cell size and cell size distribution and avoidance of an increased proportion of closed cells.

In addition, a stabilizer should meet the general requirements of being very effective, that is, it should develop its optimum effectiveness already when used in low concentrations. Furthermore, its processing latitude should be large, that is, the concentration range, in which the stabilizer can be used, should be as large as possible, so that slight changes in the foam formulation can be carried out without problems.

Due to the large number of possible raw materials for producing HR- foams, there are very many different formulation variants. As a result, the above-mentioned stabilizer requirements are highly system dependent. Consequently, special stabilizers must be developed for the respective system.

In principle, typical HR- foam stabilizers are polymers based on polysiloxanes, which are modified more or less by suitable organic groups. In general, the chain lengths of the polysiloxanes, suitable for HR- foams, are shorter than those of stabilizers used in conventional flexible foam.

Several possibilities and components are available in order to adapt the structure of the stabilizer to the particular requirements.

According to the present state of the art, essentially two groups of HR- foam stabilizers are used.

The unmodified siloxanes especially are used in inherently stable systems. In this connection, particularly the German Patent 25 33 074 and the German Offenlegungsschrift 22 21 811 should be mentioned.

In formulations, in which real physical stabilization is required in addition (for example, formulations based on filled polyols) organo-modified siloxanes are more important. Suitable polysiloxane-polyoxyalkylene copolymers are described, for example, in U.S. Pat. Nos. 3,741,917 and 4,031,044. Other suitable organo-modified siloxanes are given in the Table below:

| Modifying Group | Reference |
| --- | --- |
| cyanoalkyl- | U.S. Pat. No. 3,952,038 |
| cyanoalkoxyalkyl- | German ALS 24 02 690 |
| sulfolanyloxyalkyl- | U.S. Pat. No. 4,110,272 |
| morpholinoalkoxyalkyl- | U.S. Pat. No. 4,067,828 |
| tert. hydroxyalkyl | U.S. Pat. No. 4 039 490 |
| chloropropyl- | German Patent 36 26 297 |
| chloromethyl- | German OLS 27 36 138 |
| linear alkyl | German patent 0 037 067 |
| branched alkyl | European patent 0 243 131 |
| aralkyl- | German patent 23 56 443 |

In spite of this large number of stabilizers, it is not possible to fulfill all application requirements. Until now, there has not been a stabilizer, which can be used universally in all HR- foam systems. Furthermore, the problem of finding a balance between forming a stable foam and one which, at the same time, is a very open-celled foam, represents a particular challenge. Furthermore, new, previously unknown problems arise constantly, which cannot be solved or can be solved only incompletely with the known stabilizers of the state of the art.

The present invention is therefore concerned with the task of finding new stabilizers for the production of HR- polyurethane foams, which are able to solve already known problems better or new problems for the first time.

One problem of the HR- foams used in the automobile sector is that they contribute to undesirable fogging. Fogging is the formation of a light-scattering deposit on the interior glass surfaces of the automobile. The primary source of this deposit are volatile components of the polymer materials, which are used to equip the interior of the vehicle. Because of temperature conditions in the vehicle, these volatile materials evolve as gases and condense on the relatively cooler glass surfaces. The automobile industry therefore is interested in reducing such fogging deposits as much as possible.

The volatile components of the HR- foam are responsible for the fogging deposits caused by the HR- foam. An appreciable portion of the volatile components originates from the stabilizer. Due to production conditions, they are contained in every stabilizer mixture.

One objective of the invention therefore is to develop new stabilizers, in which these volatile components are decreased or eliminated altogether.

Furthermore, the present invention is concerned quite generally with the problem of developing stabilizers with improved properties. These properties include, in particular, a better open-cell nature of the foams and, with that, better crushing behavior with, at the same time, adequate stabilization, a higher effectiveness, a wider processing latitude, molded foams with a better skin and products, which can be used universally for HR- slabstock foam systems as well as for HR- molded systems.

OBJECT OF THE INVENTION

An object of the present invention is a method for the production of HR- polyurethane foams.

The method involves reacting a mixture of highly reactive polyols, which usually have a weight average molecular weight of between about 4800 and 6500 g/mole and at least 70% primary hydroxyl groups and optionally contain fillers, polyfunctional isocyanates, amine activators, cross-linking agents, tin catalysts, blowing agents and stabilizers, which is characterized in that, as stabilizers, compounds of the general formula

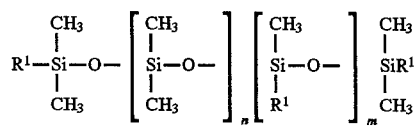

are used, in which $R^1$ is the same or different in an average molecule and represents a methyl group or a group of the general formula —$CH_2$—$CH_2$—$(CH_2)_a$—$C_6H_3(R^2)_2$ (a=0 or 1; $R^2$=—O—$CH_3$), with the proviso that at least one $R^1$ group is a group having the formula —$CH_2$—$CH_2$—$(CH_2)_a$—$C_6H_3(R^2)_2$, n has an average numerical value of 2 to 11, m has an average numerical value of 1 to 6, with the proviso that the quotient p=(n+m+2)/m is 1.66 to 12.

SUMMARY OF THE INVENTION

Compared to stabilizers of the state of the art, the stabilizers, which are to be used for the inventive method, can be employed in a lower concentration. This clearly reduces fogging by the stabilizers. The degree of open cells, measured as the force to crush, is higher for foams produced pursuant to the invention so that consequently the foams obtained exhibit a clearly reduced tendency to shrink. In particular, it is observed that the polysiloxanes, which are to be used for the inventive method, have a much better balance between the stabilizing and cell-opening properties. Moreover, skin disorders are avoided and, at the same time, good regulation of the subsurface area can be observed.

Furthermore, it is possible to produce suitable stabilizers for all high resilience foaming systems with the inventive stabilizers merely by changing the above-mentioned variables a, n and m. This is not possible with the stabilizers of the state of the art. Until now, a stabilizer or combination of stabilizers of different classes of compounds, adapted to each HR- foam system, had to be used in order to obtain a defect-free foam.

The inventive stabilizers are a new class of universal stabilizers, which can be used for HR- slabstock foam as well as for HR- molded foam and for systems based on pure TDI, mixtures of TDI and MDI and pure MDI in combination with the corresponding polyols.

Particularly preferred is an inventive method, for which compounds are used as stabilizers, which are free of polysiloxanes with a chain length of 5 or less and 16 or more. Advisably, the polysiloxanes are fractionated according to the state of the art before the introduction of the $R^1$ group(s).

If such fractionated polysiloxanes of Formula I, the composition of which differs from a statistical distribution of the polysiloxanes of different chain lengths usually obtained by equilibration, are used in HR- foam systems, the fractionated siloxanes show the following special advantages over equilibrated siloxanes:

The stabilizers have a wider processing latitude. A good stabilization is achieved, the degree of open cells in the foam is improved at the same time and, particularly for HR-molded systems, foams with a very good skin are obtained. At the same time, cell regulation is improved.

Due to the separation of the long-chain siloxanes, the tendency to shrink and defoam is far less.

Due to the separation of the short-chain siloxanes, improved fogging behavior of the foams is achieved.

The superior properties of the inventive, organo-functionally modified polysiloxanes of Formula I are confirmed by the following Examples, in which the quantities are given in parts by weight. It is understood that these Examples are provided by way of illustration and not by way of limitation.

I. Use of equilibrated, organo-functionally modified polysiloxanes.

EXAMPLE 1

A siloxane of Formula I, in which $a=1$, $n=4$, $m=2$ and $p=4$, is used as a stabilizer.

The stabilizer is tested in a typical HR- slabstock foam formulation based on filled polyols and pure TDI. The siloxane is used in different concentrations. The results are compared with those obtained using a stabilizer of the state of the art, which is preferred for this type of foam. The stabilizer is a polysiloxane, has chloropropyl groups as modifying groups in accordance with the German patent 36 26 297.

| Raw Material | Parts |
| --- | --- |
| polymer polyol | 100.00 |
| water | 3.50 |
| diethanolamine | 1.00 |
| bis(2-dimethylaminoethyl) ether | 0.05 |
| triethanolamine | 0.15 |
| dibutyl tin dilaurate | 0.15 |
| TDI | 41.00 |
| stabilizer | 0.2–1.5 |
| Index <100> | |

The index 100 means that the amount of isocyanate groups used is equal to the stoichiometrically calculated amount of isocyanate groups, required for reaction with the water and the OH groups of the polyols.

When the comparison product of the state of the art is used at a minimum concentration of 0.6 parts, a foam is obtained, in which the cell size and subsurface areas are regulated well, which is open celled and shows no shrinkage. In the bottom zone, however, there is an extensive cold collapse, which indicates incomplete cell opening.

When the inventive siloxane is used at a concentration of only 0.2 parts, foams are obtained, which have the following advantages over the standard foam: There is better cell opening, so that there is hardly any cold collapse in the bottom zone. A coarser cell structure is achieved, which provides advantageous physical properties.

The use of an unmodified polydimethylsiloxane of the German patent 25 33 074 leads to a collapse of the foam in this formulation.

EXAMPLE 2

A siloxane of Formula I, in which $a=1$, $n=4$, $m=3$ and $p=3$, is used as stabilizer.

The stabilizer is tested in a typical HR- molded foam formulation, based on solid-containing polyols and pure TDI. The siloxane is used in different concentrations. The results are compared with those obtained using a stabilizer of the state of the art, which is preferred for this type of foam and has polyether groups as modifying groups, in accordance with the European patent 0 106 101.

| Raw Material | Parts |
| --- | --- |
| PHD polyol | 100.00 |
| water | 4.00 |
| diethanolamine | 1.50 |
| triethylenediamine | 0.50 |
| bis(2-dimethylaminoethyl) ether | 0.07 |
| TDI | 47.90 |
| stabilizer | 0.1–1.5 |
| Index <100> | |

Both products are used in different concentrations. A defect-free foam cannot be produced in any of the trials with the stabilizer of the state of the art. Either there are defects in the subsurface areas (when the stabilizer is used at low concentrations) or the foam shrinks (when the stabilizer is used at higher concentrations). The nature of the skin is also defective. These defects can be eliminated only by additionally using unmodified polydimethysiloxanes. It is a disadvantage of this stabilizer that two components have to be used, which is less advantageous in practice, and that undesirable fogging results, because of the necessary use of unmodified polydimethylsiloxanes, which tend to be volatile (see Example 3).

In every respect, the inventive product is superior. When used at a concentration of only 0.1 parts, a very open-celled foam is obtained. The force to crush values (indentation load deflection in N at 50% compression, measured directly after removal of the foam from the mold) are lower when the inventive stabilizer is used than when the stabilizer of the state of the art is used, even if the latter is used in combination with an unmodified siloxane. In addition, it may be noted that the subsurface areas are regulated very well. The skin of the foam obtained shows no disorders. Because of the high open-celled nature, there is no tendency to shrinkage.

The following Table illustrates the results:

| Product | Min. Conc. Used (Parts) | Subsurface Area | Skin | Shrinkage | First Force to Crush Value [N] |
| --- | --- | --- | --- | --- | --- |
| inventive | 0.1 | OK | OK | OK | 367 |
| comparison | 0.6 | OK | vsl | sl | 970 |
| comparison + unmod. PDMS (3:2) | 0.4 | OK | OK | OK | 476 |

Key for Abbreviations:
vsl = very slightly disordered
sl = slightly disordered

An unmodified polydimethylsiloxane of the German patent 25 33 074, by itself, leads to severe defoaming within the foam cushion with this formulation and can therefore not be used.

II. Use of Fractionated, Organo-Functional, Modified Polysiloxanes.

EXAMPLE 3

As stabilizer, a siloxane of formula I with a=1, n=6, m=1 and p=9 is used. The stabilizer is free of polysiloxanes with a chain length of 5 or less or 16 and more.

The stabilizer is tested by means of a typical HR- molded foam formulation. This is based on a conventional (unfilled) polyol and a mixture of TDI and crude MDI as isocyanate component. In accordance with the state of the art, only unmodified polydimethylsiloxanes could be used as stabilizers in such formulations.

| Raw Material | Parts |
| --- | --- |
| conv. polyol | 100.00 |
| water | 3.00 |
| triethylenediamine | 0.60 |
| dimethylethanolamine | 0.20 |
| triethanolamine | 2.00 |
| 40% crude MDI/60% TDI | 46.20 |
| stabilizer | 0.1–1.0 |
| Index <100> | |

When unmodified siloxanes of the German patent 25 33 074 are used as stabilizers at a minimum concentration of 0.6 parts, a defect-free foam is obtained. If the concentration is doubled, the foam shrinks extensively.

The inventive method, carried out with fractionated, modified organopolysiloxane, permits stabilizers to be used in a wide range of concentrations from 0.1 to 1.2 parts. Basically, more open, non-shrinking, very well regulated foams are obtained even when very high concentrations are used. A particular advantage of these fractionated products, used for the inventive method, lies in their broad processing latitude. This is expressed in the force to crush values listed below.

| Product | Concentration (parts) | First Force to Crush Value [N] |
| --- | --- | --- |
| inventive | 0.1 | 625 |
| | 0.6 | 705 |
| | 1.2 | 808 |
| comparison | 0.1 | No subsurface area regulation |
| | 0.6 | 879 |
| | 1.2 | extensive shrinkage |

Moreover, the inventive foams decrease fogging, as shown by the fogging values determined by the method of DIN 75201B. In both cases the stabilizers were used at a concentration of 0.6 parts:

| fogging value - comparison | 2.7 mg |
| --- | --- |
| fogging value - inventive | 1.1 mg |

Previously, in accordance with the state of the art, it was not possible to use organo-modified siloxane successfully for these molded foam systems, because these siloxanes caused extensive shrinkage of the foams because of over-stabilization.

EXAMPLE 4

As stabilizer, a siloxane of formula I with a=1, n=5, m=1 and p=8 is used. The stabilizer is free of polysiloxanes with a chain length of 5 or less or 16 and more.

The stabilizer is tested with a filled polyol/TDI molded foam composition. A stabilizer of the state of the art according to the German patent 36 26 297, which is modified with chloroalkyl groups, serves as comparison.

Furthermore, a stabilizer with the subscripts given above and based on equilibrated, organo-functionally modified siloxanes, serves for comparison here.

| Raw Material | Parts |
| --- | --- |
| PHD-polyol | 100.00 |
| water | 4.00 |
| diethanolamine | 1.50 |
| triethylenediamine | 0.50 |
| bis(2-dimethylaminoethyl) ether | 0.07 |
| TDI | 47.90 |
| stabilizer | 0.1–1.5 |
| Index <100> | |

The following results are obtained.

| Product | Concentration Parts | Subsurface Area | Skin | Shrinkage | First Force to Crush Value [N] |
| --- | --- | --- | --- | --- | --- |
| inventive fractionated | 0.1 | OK | OK | OK | 323 |
| | 0.6 | OK | OK | OK | 455 |
| | 1.0 | OK | OK | OK | 531 |
| inventive equilibrated | 0.1 | OK | OK | OK | 644 |
| | 0.6 | OK | OK | vsl | 958 |
| | 1.0 | OK | OK | sl | 1230 |
| comparison | 0.1 | OK | OK | vsl | 687 |
| | 0.6 | OK | sl | sl | 1045 |
| | 1.0 | very extensive shrinkage | | | |

Key for Abbreviations:
vsl = very slightly disordered
sl = slightly disordered

It is seen that, over a wide range of concentrations, a defect-free, well regulated foam is obtained with the stabilizer, which is used for the inventive method and is based on fractionated siloxanes. In comparison to products of the state of the art, the outstanding advantages are a broader processing latitude with retention of good effectiveness and an outstanding open-celled nature even at high concentrations, no tendency to shrink and a particularly good skin quality.

In comparison to the stabilizer based on equilibrated siloxanes, the wide processing latitude is a particular advantage. Due to the removal of the long-chain siloxanes, particularly the tendency to shrink becomes far less.

In general, it can be seen that the stabilizers used for the inventive method represent a new class of compounds with superior properties. In contrast to the stabilizers of the state of the art, the inventive stabilizers can be used universally in HR- slabstock systems, as well as in HR- molded foam systems and in formulations based on pure TDI, on mixtures of TDI and MDI, as well as on pure MDI in combination with the appropriate polyols.

Until now, it was unavoidable to use stabilizers of different classes of compounds or combinations of stabilizers of different types for each HR- foam system, which had been adapted in each case for the system.

The special property of the inventive stabilizers, moreover, consists of the outstanding balance between the adequate stabilization and, at the same time, the open celled nature of the HR- foams. The stabilizers have a broad processing latitude and lead to foams with a skin of a particularly good quality.

Moreover, the inventive stabilizers are distinguished by a high effectiveness which, aside from their inherent lower volatility, results in clearly less fogging by the foams because less of the stabilizer is used. The stabilizers can also be used in combination with unmodified siloxanes.

What is claimed is:

1. A method for the production of high resilience polyurethane foams by reacting a mixture of polyols, having a weight average molecular weight of between about 4800 and 6500 g/mole and at least 70% primary hydroxyl groups, and optionally fillers, polyfunctional isocyanates, amine activators, cross-linking agents, tin catalysts, blowing agents and stabilizers, comprising the steps of adding, as a stabilizer, a compound of a general formula

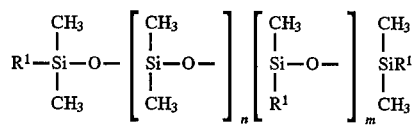

in which $R^1$ is same or different in an average molecule and represents a methyl group or a group of general formula —$CH_2$—$CH_2$—$(CH_2)_a$—$C_6H_3(R^2)_2$ (a=0 or 1; $R^2$=—O—$CH_3$), with the proviso that at least one $R^1$ group is a group having the formula —$CH_2$—$CH_2$—$(CH_2)_a$—$C_6H_3(R^2)_2$, n has an average numerical value of 2 to 11, m has an average numerical value of 1 to 6, with the proviso that the quotient p=(n+m+2)/m is 1.66 to 12.

2. The method of claim 1, wherein the stabilizers added are free of siloxanes having a chain length of 5 or less and of 16 or more.

* * * * *